United States Patent [19]
Chapman

[11] 3,948,768
[45] Apr. 6, 1976

[54] METHOD AND APPARATUS FOR SEPARATING OIL FROM AQUEOUS LIQUIDS

[76] Inventor: Willis F. Chapman, 6511 Jay Miller Drive, Falls Church, Va. 22041

[22] Filed: July 7, 1975

[21] Appl. No.: 591,841

Related U.S. Application Data

[63] Continuation-in-part of Ser. No. 440,093, Feb. 6, 1974.

[52] U.S. Cl. ............... 210/20; 210/23 R; 210/73 W; 210/266; 210/289; 210/293; 210/301; 210/302; 210/307; 210/316; 210/317; 210/DIG. 5; 210/DIG. 26
[51] Int. Cl.² ......................................... B01D 13/00
[58] Field of Search ......... 210/20, 23, 73, 109, 110, 210/115, 266, 287, 289, 291, 293, 300, 301, 302, 307, 314, 316, 317, DIG. 5, DIG. 21; 208/187, 188; 196/14.5

[56] References Cited
UNITED STATES PATENTS

| | | | |
|---|---|---|---|
| 1,947,709 | 2/1934 | Garrison et al. | 210/23 |
| 2,922,750 | 1/1960 | Price | 210/23 |
| 3,208,596 | 9/1965 | Gravert | 210/23 |
| 3,450,632 | 7/1969 | Olson et al. | 210/23 |
| 3,469,702 | 9/1969 | Perren | 210/540 |
| 3,797,766 | 7/1973 | Brooks | 210/300 |

*Primary Examiner*—Charles N. Hart
*Assistant Examiner*—F. F. Calvetti
*Attorney, Agent, or Firm*—Dressler, Goldsmith, Clement & Gordon, Ltd.

[57] ABSTRACT

A method and apparatus are provided for separating fine oily particles from aqueous liquids at very high flow velocities by passing the mixture upwardly through an unconfined mass of oleophilic granules in a column with adequate velocity to separate and lift the individual granules into the upwardly flowing mixture within the column where movement of the individual granules serves to collect and coalesce the fine oily particles, and finally to release large oil drops back into the mainstream of the upwardly flowing mixture column. These large oil drops are then intercepted and extracted by a steeply inclined screen and caused to flow to storage in the form of a fine oil film propelled by the force of the flow of the aqueous liquid through the screen.

11 Claims, 4 Drawing Figures

LEGEND
OIL - - - - →
WATER ——→

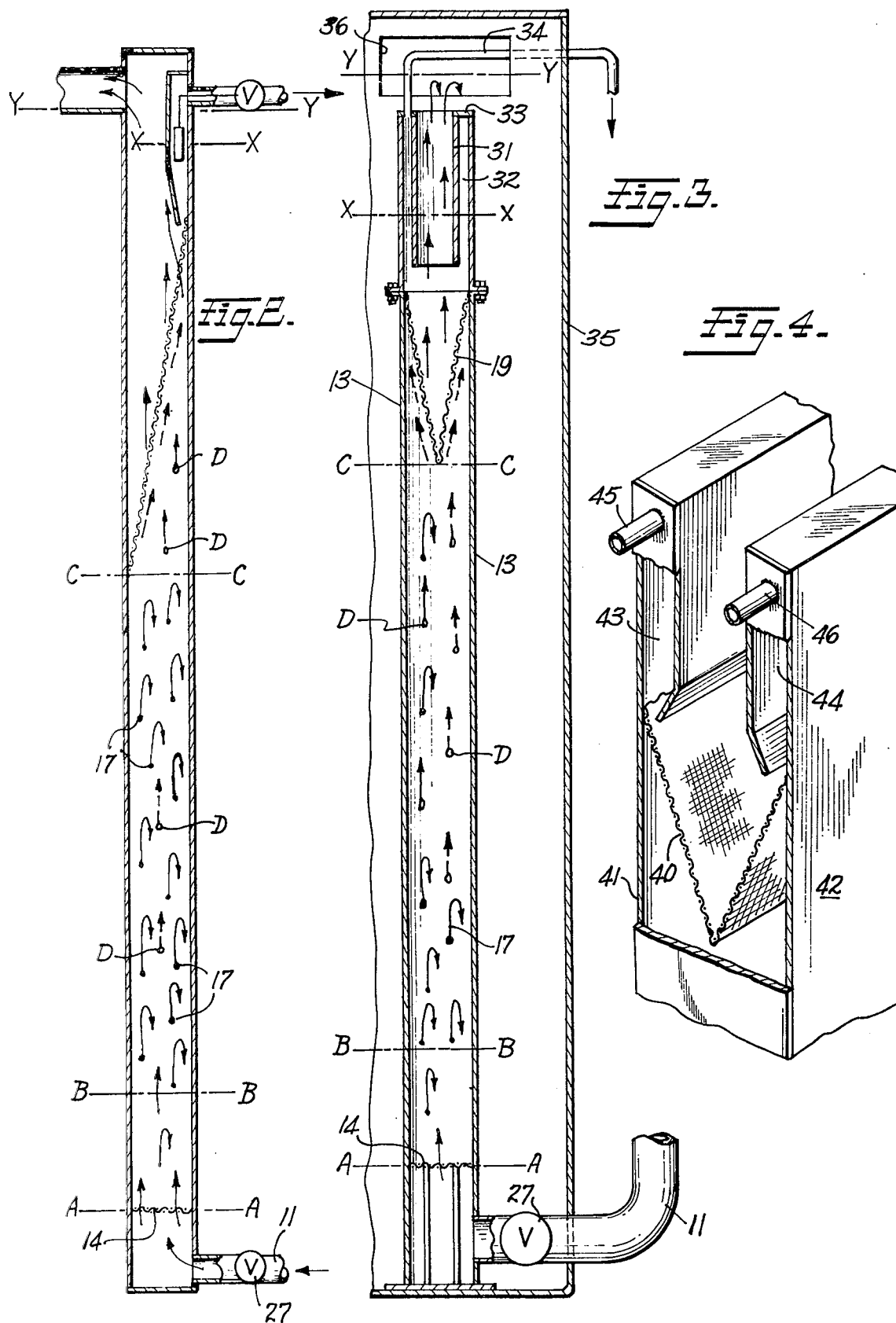

METHOD AND APPARATUS FOR SEPARATING OIL FROM AQUEOUS LIQUIDS

This application is a continuation-in-part of my prior application Ser. No. 440,093, filed Feb. 6, 1974.

This invention relates to a method and apparatus for the separation of two immiscible liquids, especially but not exclusively limited to removing contaminating oil from water.

Water/oil separators for removing oil from water are generally based on passing a water/oil mixture through a coalescing media and then separating the two liquids by gravity or, by using gravity separation alone associated with sophisticated geometry within the separator. Coalescing materials in fixed beds, expanded beds, mats, batts, cartridges, etc., are inherently limited to low flow velocities through these media of something less than 0.5 ft/minute because at greater flow velocities the turbulence or agitation created within these media tend to emulsify the contaminating oil rather than coalesce it. In order to achieve a higher degree of clarification of the water effluent, smaller orifices between the material of the coalescing media are required. The smaller the orifices, the more severe the inherent tendency of these coalescing media to clogging by fine particulate material, necessitating more frequent cleaning or replacement. Progressive clogging continually increases the restriction of flow through the coalescing media bed. Each separator using these techniques is, therefore, a compromise between the high degree of water clarification desired and the practical limits imposed by the very low flow rate required to achieve it.

The use of gravity separation also imposes a similar compromise between the degree of water clarification desired and the flow rate because of the long time required to permit the various sizes of fine oil droplets to rise to the surface. To achieve a reasonably high degree of water clarification, a long residence time in a quiescent zone is required. This severely reduces the flow rate through the separator and limits the degree of water clarification which is practical.

The object of this invention is to provide a simple and economical method and apparatus for removing contaminating oil from water, by which it is possible to greatly increase the flow rate, eliminate clogging, insure continuous and uninterrupted operation, increase the degree of clarification of the water effluent, recover more oil, and greatly reduce the size of the apparatus which is required.

This invention is generally applicable to all oily substances susceptible to being coalesced in the presence of the continuous liquid. The method and apparatus described herein are suitable for the separation of many immiscible liquid combinations, so long as the coalescing granules selected have an affinity for the suspended oily particles and not for the continuous liquid phase. Since the invention, however, is primarily directed to the removal of oily particles from water, the invention will be described with reference to its normal form in which the contaminating material is oil, and the aqueous liquid is water.

The method of this invention separates oil from a mixture of oil in water by first passing the mixture upwardly in a column through an upwardly unconfined mass of oleophilic granules having a specific gravity greater than water with a velocity adequate to separate and lift the granules individually so that they are completely free from mutual support in the upwardly rising mixture within the column. The velocity should not be so great that it will prevent the granules from descending against the flow of the mixture. It is also preferable that the granules not strike a steeply inclined screen positioned above the mass of granules. The granules move up and down within the column and collect and coalesce the fine particles of oil within the mixture and release the surplus oil back into the rising mixture column in the form of visible oil droplets. The rising mixture column then transports these large oil droplets upwardly to a steeply inclined screen to force the oil droplets to engage the screen. It is preferred to incline the screen at an angle of at least about 75° to the horizontal which corresponds to a maximum of about 15° to the upward flow of the mixture column. These large oil droplets impinge on the material of the inclined screen and form a film of oil on the material of the said screen which is propelled upwardly by the force of the upward flow of liquid through the inclined screen. This moves the oil to a solid oleophilic path, which is usually the wall of the container, and then upwardly to an oil storage chamber and oil outlet. The water passes upwardly through the inclined screen, and then flows to a water receiving chamber and water outlet.

Screens constructed and arranged to permit the passage of both oil and water in a mixture thereof, in the direction of the main flow, are well known. Screens constructed and arranged to permit the passage of oil and prohibit the passage of water in a mixture thereof, in the direction of the main flow, are also well known. However, the construction and arrangement of a screen with associated apparatus to permit the passage of water and prohibit the passage of oil is believed to be new, and is a feature of this invention.

I have discovered that a screen which is steeply inclined as previously described will remove oil and permit the passage of water under flow velocities varying from approximately 6–90 ft/minute. The flow of the liquid at these velocities causes the oil film to be uniformly distributed on the material of the steeply inclined screen, and the force of the flow of liquid through this steeply inclined screen propels the oil film under laminar flow conditions, along the material of the inclined screen in the general direction of the flow without having the oil film exhibit any tendency to reform into drops which might be released back into the water flowing through the inclined screen. If, due to high oil concentration, the capacity of a single inclined screen is exceeded, two or more inclined screens in series can be used to remove any oil droplets released by the first inclined screen.

In order to remove emulsified oil as well as visible oil droplets from a fast moving oil-in-water mixture, it became necessary to depart from conventional coalescing practices of fixed beds, expanded beds, coalescing cartridges, etc. and seek a method which is devoid of agitation and turbulence at high flow rates to prevent the reemulsification of the oil passing from the coalescing media. Translating this into practice, it became necessary to create an environment in the coalescing zone in which each coalescing granule operated independently, and free from mutual support, to be acted upon solely by the force of gravity with respect to the water-oil mixture column. I have discovered that within the previously noted range of flow velocities, individual granules of a mass of oleophilic granules will rise and fall individually in an upwardly rising non-turbulent mixture column, acted upon by the resistance of the granule to the upward direction of flow of the mixture column and the downward velocity created by gravitational acceleration. This creates a non-turbulent situation within the column which favors coalescing emulsified particles as well as small visible oil droplets, yet is without the subsequent agitation and turbulence necessarily present in exiting from conventional fixed coalescing beds, expanded beds, cartridges, etc., when flow velocities exceed approximately 0.35 ft/minute through the small orifices of these media. With granules having specific gravities varying from approximately 2.0 – 3.5, the flow velocities required to activate the granules individually in the mixture column as described above, are within the noted limiting flow velocities required for the satisfactory operation of the steeply inclined screen.

As each oil coated oleophilic granule rises and falls vertically in the non-turbulent rising mixture column, it cleanses a portion of the mixture column of fine oily particles and coalesces them until an accumulation of surplus oil on the granule is sheared off by the passing mixture column in the form of an oil droplet which is released back into the mixture column and then transported upwardly with the mixture column (now largely free of fine oil particles) to be intercepted and extracted from the mixture column by the steeply inclined screen as previously described.

This invention will be described employing a preferred construction in which the separator has the form of a vertical cylinder, but the invention is not restricted to cylindrical geometry.

There is no restriction as to size and a small separator would be applicable to a small industrial flow exiting into a sewer system. Of greater importance in the light of the high flow rates permitted by this invention, is the fact that separators of reasonable size are applicable to large industrial systems such as an oil refinery, oil field, oil drilling platform, harbor terminals, heavy industrial installations, etc., with effluents exiting into natural waters. It would be highly effective aboard ships for cleaning bilge wastes and also for cleaning ballast water on oil tankers or other ships whose wastes are contaminated with oily substances. It would be particularly applicable to large oil spills at sea where a severe requirement exists to separate oil rapidly from large volumes of sea water, simultaneously recovering the oil and returning clean water to the environment. When the concentration of oil in the water is higher than can be efficiently handled with a single separator, then two separators should be used in series.

The oleophilic granules which are employed may be of diverse character and are heavier than the water which is passed upwardly through the granules. Silica particles of appropriate size can be used, but these are preferably treated to increase their affinity for oil. Aluminum granules are also useful. The preferred density of the oleophilic granules is in the range of 2.0 – 3.5 as noted previously. Particle size is not of prime significance, so long as the particle is able to resist being carried away by the moving liquid.

It is essential that the mass of oleophilic granules be unconfined above the foraminous support which supports the granules when the apparatus is not in use. If the granules are confined, then the granules are packed together by the moving liquid, and this severely restricts flow, and the accumulation of material in the compacted bed further restricts flow. Also, when the granules are packed together, severe reemulsification would result at the high flow rates at which this separator is designed to operate.

It is stressed that the conventional coalescing media, relying on small orifices for coalescence, becomes clogged with foreign particles in use and must be replaced or its materials must be cleaned frequently. In this invention, the granules need not be replaced or cleaned since the surplus oil collected by the granules is continuously removed therefrom. Fine particulate material passes through this separator without clogging.

The invention will be more fully understood from the accompanying drawings in which:

FIG. 2 is a simple schematic cross-section illustrating the method.

FIG. 3 shows a modified cylindrical configuration in which the purified water passes straight through the separator with the oil being directed into an annular chamber.

FIG. 4 is another vertical cross-section showing a rectangular configuration and using a steeply inclined screen in a V-shape to direct oil to flow to both sides. This unit is particularly adaptable to modular construction within a common container.

Figure 1:
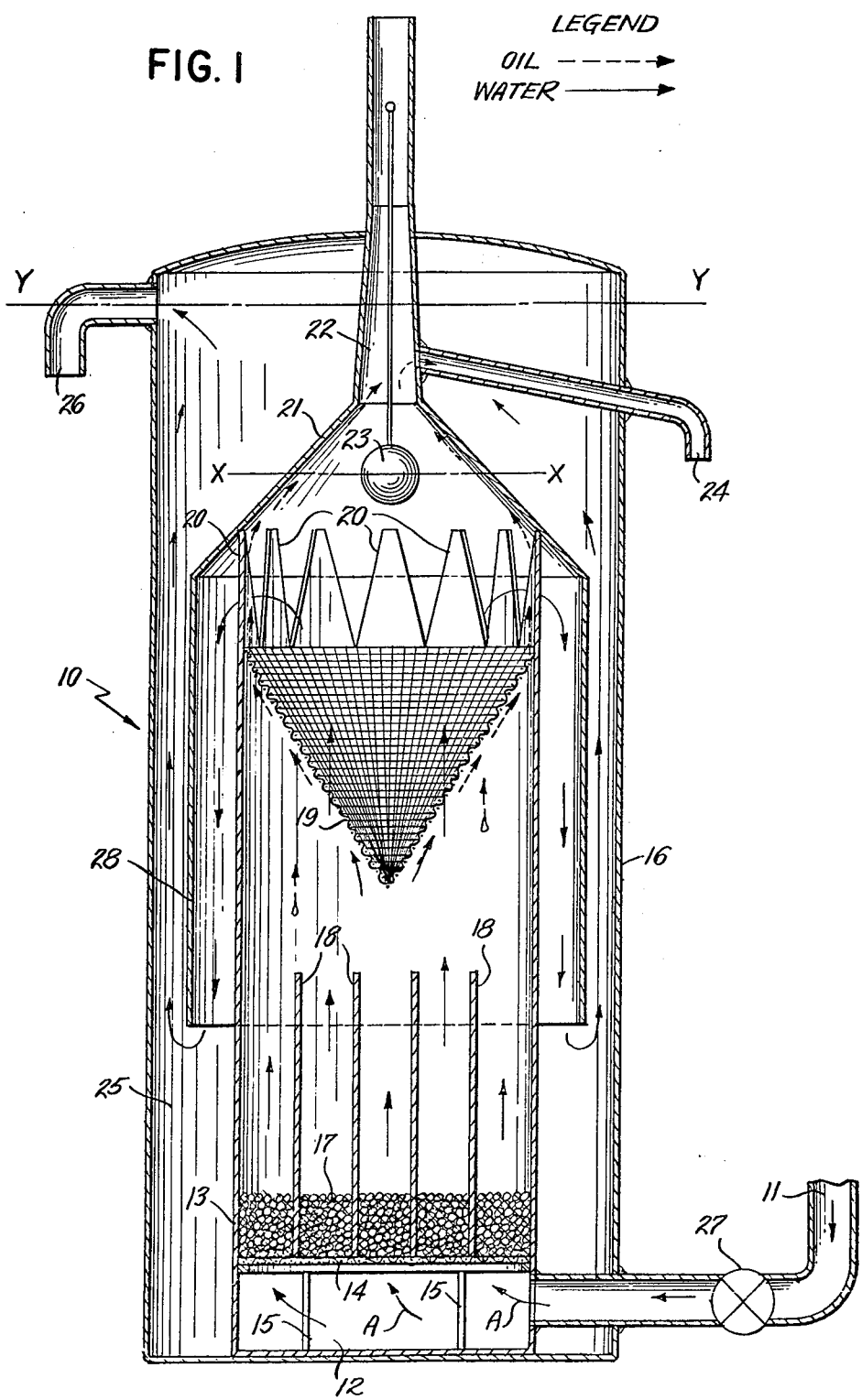
FIG. 1 is a vertical cross-section of an illustrative separator constructed in accordance with this invention, and employing a cylindrical geometry.

Referring more particularly to FIG. 1, a mixture of oil in water prescreened to eliminate foreign particles larger than the screen size used hereinafter to separate the oil is pumped to a separator assembly identified generally by the numeral 10. The separator 10 has an inlet 11 at its lower end through which the mixture flows into a mixture inlet chamber 12 which is positioned at the bottom of a vertical tube 13. This tube 13 takes the form of a container which is concentrically positioned within the outer walls of casing 16 of the separator 10. This mixture inlet chamber 12 is formed beneath a foraminous support 14 (a screen) which is positioned above the bottom of the tube 13 by means of a supporting structure 15.

Contained in tube 13 and resting on screen 14, are oleophilic granules 17, these granules having a specific gravity greater than water as previously explained.

The inner container 13 is partitioned as shown at 18 so that the screen 14 is divided into a series of side-by-side zones. This is done when the container 13 is large, and it serves to maintain an even distribution of granules across the screen 14. As can be seen, the mixture passes through the inlet 11 into the chamber 12, and passes upwardly as shown by arrows A with sufficient velocity to lift the granules 17 as previously described, and then through the inner container 13 toward an overhead steeply inclined screen which is here constituted by a conical screen 19.

The upper end of the inner container 13 is notched forming teeth 20, and the upper end of the inverted conical screen 19 is secured to the container wall below the lower end of the teeth 20. As a result, water flowing upwardly through the container 13 will pass upwardly through the inclined screen 19, and any drops of oil which have been released by the granules 17 will be intercepted by the inclined screen 19, and form a film on the material of the screen. The upward pressure of the water passing through the screen forces the oil upwardly on the screen until it contacts the wall of container 13, and the oil will continue to move upwardly on teeth 20 at the upper end of container 13. The screen, the wall of container 13, and the teeth 20 provide a solid oleophilic path for the flow of oil to storage.

The steeply inclined screen removes all the visible oil. The angle of inclination which is needed is easily found for any screen by a brief check, or it can be approximated by tilting the screen until the eye can discern no open spaces. An angle of at least about 75° to the horizontal is generally required.

Overlying the upper end of the container 13 is a conical oil collector 21, the teeth 20 contacting the interior of the conical collector 21. As a result, the oil collected by the screen 19 is forced upwardly along the oleophilic path until it reaches the conical collector 21 which leads to an oil storage chamber 22 positioned at the upper end of the oil collector 21. The recommended oil-water interface level in the device is shown by the phantom line X—X. An oil-water interface sensor and flow restrictor float 23 is provided to prevent water from flowing upwardly out of the oil collector 21 via the oil outlet 24. When too little oil remains in collector 21, the interface sensor 23 rises to prevent water from exiting via outlet 24.

At the same time that the oil is exiting from the separator 10 through outlet 24 as described, water which has passed through the screen 19 flows outwardly through the space between teeth 20 which extend above the screen 19 and below the oil collector 21. The water, now free of oil, is then passed through the annular chamber 25 formed between the exterior casing 16 of the separator and the container 13 to the water outlet 26.

The operation of the separator structure shown is extremely simple, it being only necessary to pump the mixture through the separator, clean water exiting at 26, and the collected oil exiting at 24. The overall level of liquid in the separator shown by the phantom line Y—Y provides sufficient pressure head to raise the oil level to the oil outlet 24. A pressure actuated one way valve 27 in the inlet line 11 insures a minimum flow rate and it also prevents back flow from accidental pressure drop or shutdown which might result in oil entering the clean water exit route.

The structure shown enables satisfactory operation even when the separator is tilted as might occur aboard ship. A skirt 28 which depends downwardly from the lower end of the conical oil collector is provided to contain the water-oil interface level within collector 21 during tilts.

The method of this invention is simply shown in the schematic cross section of FIG. 2 which uses the same numbers employed in FIG. 1.

As can be seen, the mixture of oily particles in aqueous liquid enters at 11, and moves past valve 27 to a foraminous support 14. The mass of oleophilic particles rests on screen 14 between levels A—A and B—B when there is no flow. The optimum depth of the mass of granules at rest may vary between about 6 and 18 inches in height, depending on the effectiveness of the particular granules. When the mixture is being pumped through the separator with adequate velocity, the granules are lifted as individual granules free from the support of other granules, into a contact zone which lies generally below the level C—C which is the bottom of the steeply inclined oil interceptor screen 19. The distance between the levels B—B and C—C is normally at least 20 inches, and is more preferably at least 30 inches. The granules 17 rise and fall individually as indicated, effectively scrubbing the oily particles out of the mixture. Ultimately, drops of oil D are released by the granules 17, and these are propelled upwardly by the rising mixture until they strike against the screen 19 merging into the oil film thereon. This film is propelled upwardly to the top of the screen where it engages the side wall of the container 13, the oil moving along a continuous oleophilic path to an oil storage area 22. The level X—X identifies the oil interface, and Y—Y identifies the water level at the water outlet 26. The oil exits via outlet 24.

Turning to FIG. 3, the structure is very similar to that shown in FIG. 1, but the structure for the removal of oil and clarified water is modified to simplify the structure and permit a plurality of separators to be coupled within a common container.

Continuing to use corresponding numerals where appropriate, the rising mixture passes through the contact zone below level C—C until it contacts the conical screen separator 19. However, the top of the container 13 is not notched and, instead, a tube 31 is inserted so that the oil on conical screen 19 is propelled upwardly and outwardly by the rising mixture to force the oil onto the container wall 13 where it moves into an annular oil storage chamber between the container 13 and the tube 31. This oil storage chamber 32 is closed at the top by a circular plate 33 which has an outlet 34 through which oil may exit directly or may lead to an oil storage chamber which may be common to several units. An oil-water interface sensor and valve arrangement not shown may be used to maintain the oil-water interface at the level X—X in the common oil storage, but it is simpler to merely extend the outlet tube above the water level Y—Y, as shown.

The water passing through screen 19 moves straight out through tube 31 to a tank 35. Many separator units would be positioned within tank 35 which would serve as a common receptor for all of the water which is purified. Water exits from tank 35 via ports 36 which maintain the water level at the level Y—Y.

Referring to FIG. 4, the structure here is rectangular, rather than cylindrical, the rectangular form being preferred where a plurality of units are combined into a composite structure served by a common water receptor as in FIG. 3. Only the upper end of the structure in FIG. 4 is shown since this is all that is significant in this aspect of the invention. As will be seen, the conical screen 19 is now transposed into a flat, V-shaped screen 40 so as to direct the oil which is intercepted by the screen to the parallel side walls 41 and 42. The oil moving upwardly along the walls 41 and 42 finds itself trapped within the closed oil storage chambers 43 and 44, respectively, at the upper end of the structure, and the water passing through the screen 40 moves out of the apparatus, passing between the oil storage chambers 43 and 44. Where the unit is to be one of many within a common chamber, the upper end of the unit between the chambers 43 and 44 is left open, and water simply spills out, thereby discharging into the common container. If the structure is to be used separately, then the upper end of the unit can be closed, and the water can be piped off as desired from between the oil chambers 43 and 44. Oil outlets 45 and 46 are shown for tapping off the oil which is collected in a common oil collector similar to that shown in FIG. 3.

It will also be appreciated that various adjuncts and controls can be added but these are aspects of commercial operation as opposed to the new oil removal structure, and the novel separation and recovery procedure.

The invention is defined in the claims which follow.

I claim:

1. A method for separating oil from a mixture of oily particles in an aqueous liquid comprising the steps of, first passing said mixture upwardly as a non-turbulent rising mixture column through an upwardly unconfined mass of oleophilic granules having a specific gravity greater than water with a velocity adequate to separate and lift the granules individually so that they are completely free from mutual support in the upwardly rising mixture, but at a velocity not so great as to prevent the granules from descending by gravity against the flow of the mixture, whereby the granules will move up and down to collect and coalesce fine oily particles and release the surplus oil back into the rising mixture column in the form of visible droplets, and then passing the upwardly moving mixture containing said droplets of oil through a steeply inclined screen to remove the oil droplets so that water free of oil will pass through said screen to enable its removal, and the oil is left as a film on the material of said inclined screen to be propelled upwardly via a solid oleophilic path toward an oil storage area above said screen by the upward movement of the water, and removing the clarified water which passes through said screen.

2. Apparatus for removing oil from a mixture of oily particles in an aqueous liquid comprising, a separator having a mixture inlet chamber at the lower end positioned beneath a foraminous support, a mass of oleophilic granules having a specific gravity greater than water resting on said foraminous support under no-flow conditions, said mass of granules being upwardly unconfined so that said mixture can flow upwardly through said foraminous support and then through said mass of granules with a velocity adequate to lift said granules individually and free from mutual support into a contact zone above the foraminous support in which the granules contact the oily particles in the mixture to collect and coalesce oil from said mixture and then release the oil in the form of visible droplets back into the rising non-turbulent mixture column, a steeply inclined screen located above said contact zone in the path of the upwardly moving liquid leaving said contact zone, said screen removing the droplets of oil from said mixture, the upper portion of said inclined screen communicating via a continuous solid oleophilic path with an oil storage chamber positioned above the screen so that oil removed by said screen will flow to storage and oil outlet means, and outlet means for removing clarified water which has passed through said screen.

3. Apparatus as recited in claim 2 in which said inclined screen is inclined at an angle of at least about 75° to the horizontal.

4. Apparatus as recited in claim 2 in which said oleophilic granules have a specific gravity of from approximately 2.0 to approximately 3.5.

5. Apparatus as recited in claim 2 in which the distance from the top of said mass of granules, when said granules are at rest, to the bottom of said screen is at least 20 inches.

6. Apparatus as recited in claim 2 in which the distance from the top of said mass of granules, when said granules are at rest, to the bottom of said screen is at least 30 inches.

7. Apparatus as recited in claim 2 in which said separator is cylindrical and said inclined screen is a conical screen communicating at its upper periphery with the interior of said cylindrical separator.

8. Apparatus as recited in claim 7 in which a tube extends into the upper end of said cylindrical separator so that the water passes out of the separator through said tube and the oil is moved along said screen into an annular oil storage chamber between said separator and said tube.

9. Apparatus as recited in claim 2 in which said separator is rectangular and said inclined screen is a V-shaped screen communicating at its edges with the interior of said rectangular container.

10. Apparatus as recited in claim 2 in which a plurality of separator units are placed within a common water receptor, said separator units overflowing into said receptor, and said receptor having an outlet means to maintain the water level desired in said separator units.

11. Apparatus as recited in claim 2 in which an oil-water interface sensor is positioned within the oil storage chamber and communicates with an oil outlet control valve for maintaining the oil-water interface level within the oil storage chamber.

* * * * *